US012794694B2

(12) United States Patent
Jenney

(10) Patent No.: US 12,794,694 B2
(45) Date of Patent: Nov. 10, 2026

(54) CORRELATING DECRYPTED DATA WITH NETWORK CONNECTIONS

(71) Applicant: NetScout Systems, Inc., Westford, MA (US)

(72) Inventor: Douglas Jenney, McKinney, TX (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 19/042,871

(22) Filed: Jan. 31, 2025

(65) Prior Publication Data

US 2026/0230321 A1 Aug. 6, 2026

(51) Int. Cl.
*H04L 9/32* (2006.01)

(52) U.S. Cl.
CPC .................................... *H04L 9/32* (2013.01)

(58) Field of Classification Search
None
See application file for complete search history.

(56) References Cited

U.S. PATENT DOCUMENTS

2024/0340271 A1* 10/2024 Rivera .................. H04L 63/166
2025/0047650 A1* 2/2025 Jagarlapudi ........... H04L 63/166

FOREIGN PATENT DOCUMENTS

CN 117879940 A 4/2024
WO WO-2020/106973 A1 5/2020

OTHER PUBLICATIONS

EP Extended Search Report dated Jun. 11, 2026 in European Patent Application No. 26154967.9.

* cited by examiner

*Primary Examiner* — Ali S Abyaneh
*Assistant Examiner* — Felicia Farrow
(74) *Attorney, Agent, or Firm* — Foley & Lardner LLP

(57) ABSTRACT

A system may include one or more memory devices storing instructions thereon that, when executed by one or more processors, cause the one or more processors to obtain network connection information associated with communication across a network, store the network connection information in a first data cache, detect an initiation of a Secure Sockets Layer (SSL) function, identify an initiation of data transmission function that results in (i) a transmission of the encrypted data packet to a network stack or (ii) receipt of the encrypted data packet from the network stack, detect a termination of the data transmission function, store a network socket handle in a second data cache, detect a termination of the SSL function, wherein detection of the termination of the SSL function triggers, and associate one or more segments of the network connection information with a payload based on a context of the SSL function.

23 Claims, 7 Drawing Sheets

CORRELATING DECRYPTED DATA WITH NETWORK CONNECTIONS

BACKGROUND

Comprehensive session analysis often require, but is not limited to, correlation of network traffic data at the transaction, call leg, handover, and session levels.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
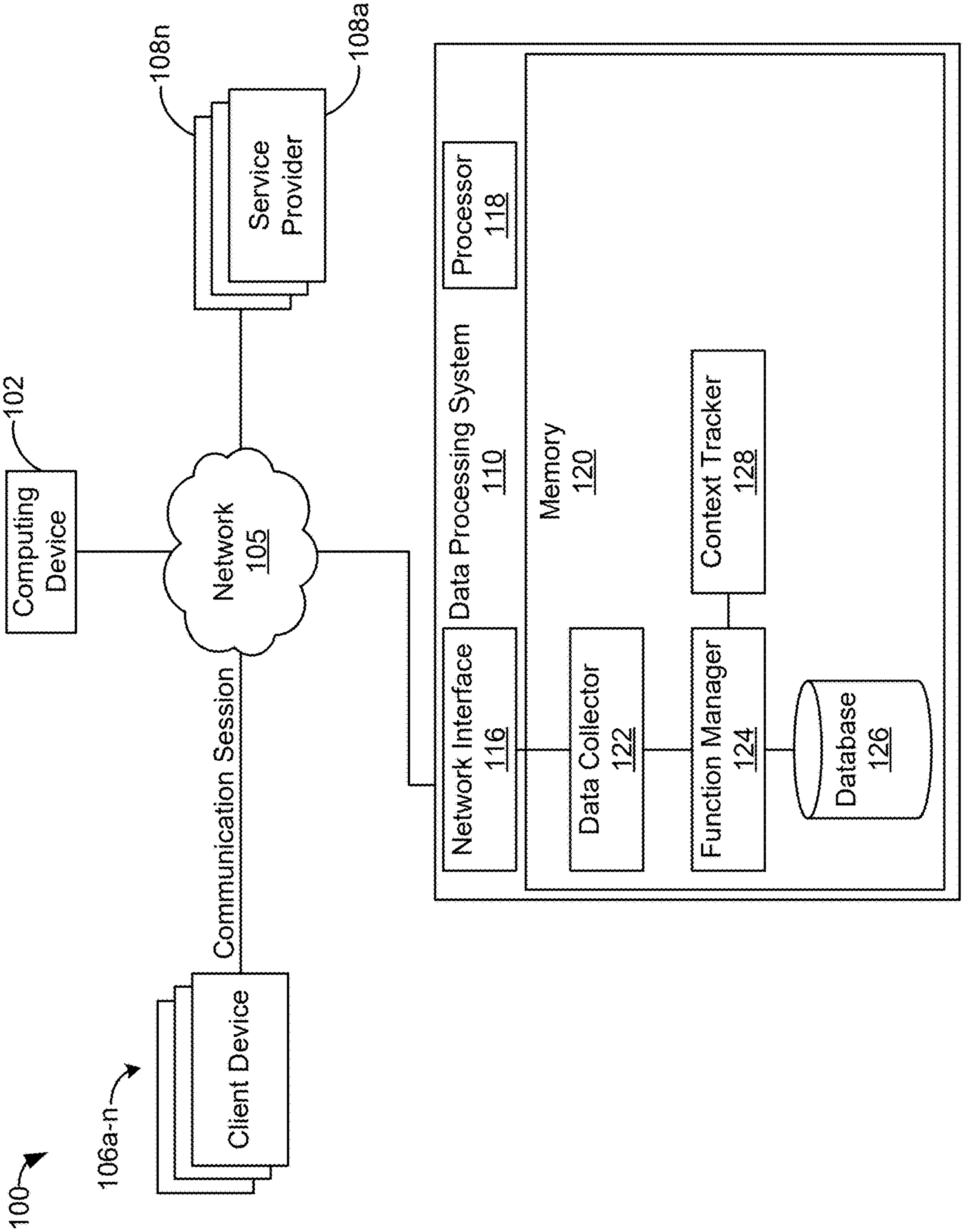
FIG. 1 is an illustration of a system for correlating decrypted data with network connections, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Comprehensive session analysis may involve correlations between network traffic data during different levels and/or layers. For example, correlations of data during transaction, call leg, handover, or session levels. When data correlation includes a combination of packet data parsed from level 3 layer (e.g., the network layer), level 4 layer (e.g., transport layer), and level 7 layer (e.g., the application layer) a complete analysis of a session may be possible (e.g., a comprehensive session analysis). However, when network communication includes encrypted network data, it is typical for data from only one of the layers to be accessible. Stated otherwise, if data associated with the level 3 layer is available, then data associated with the level 7 layer is usually not available. Additionally, comprehensive session analysis is incompatible with various protocols such as the TLSv1.3 protocol and is also inadequate when implemented after session handshakes have occurred.

Additionally, monitoring encrypted TLS traffic is traditionally resolved by physically tapping an external source and using a provided decryption key to access the application layer, but this method is not suitable when a decryption key is unavailable, or the monitored network is virtual with no physical location to tap.

The techniques described herein may overcome the aforementioned technical deficiencies in correlating data for comprehensive session analysis. A computer may do so by implementing one or more Extended Berkeley Packet Filter (eBPF) programs. For example, the computer could attach an eBPF program directly to the encryption/decryption routines in a running user app. By attaching the eBPF program to the encryption/decryption routine, the computer can acquire in-the-clear data (e.g., decrypted data, plain text, unencrypted data, etc.) without a decryption key or encryption key. Moreover, this utilization of the eBPF program is compatible with the TLSv1.3 protocol.

Even though the eBPF program can acquire in-the-clear data, the computer would not have direct access to data from the level 3 layer or the level 4 layer. To overcome this hurdle, the computer may attach one or more additional eBPF programs to entry and/or exits routines such that data corresponding to each routine may be paired to one another. The computer can correlate data by matching network socket to network connection data. For each connection or network socket, an operating system stores all network socket information, referenced by a unique network socket handle that is chosen by the operating system (OS). The computer can retrieve network connection data (e.g., layer 3 data, layer 4 data, etc.), along with the network socket identifiers (e.g., network socket handles) from the OS. Once the network connection data is retrieved, the computer can cache the network connection data in one or more caches and/or tables (e.g., a connection cache). The connection caches can be accessible to eBPF programs.

The computer can use eBPF programs to hook (e.g., connect, etc.) into system routines for sending and receiving network data. For example, an eBPF program may be connected to send_network_data operations. When a function (e.g., send_network_data operations, receive_network_data operations, etc.) is executed, the eBPF program can intercept or obtain the network socket handle used for sending/receiving data. The eBPF program can store the network socket handle in a cache and/or table (e.g., a send/receive cache or send-receive table). The network socket handles, stored in the send/receive cache, can be accessible to other eBPF programs.

The computer can use additional eBPF programs that hook (e.g., connect) into an application's (e.g., a user application, a computer application, a webpage, etc.) encryption/decryption routines. For example, the eBPF can detect Secure Socket Layer (SSL) function calls associated with the encrypted and/or decryption of plain text. The SSL function calls can include one or more SSL_write operations and/or one or more SSL_read operations. Given that the eBPF program can detect the SSL function calls (e.g., SSL operations), the eBPF program can obtain or identify pointers that identify a location of where the plain text/unencrypted data is being stored. Stated otherwise, the eBPF program can obtain the in-the-clear data (e.g., data from the level 7 layer).

The computer can use eBPF program to pair entry routines with exit routines as contexts. As an example, the entry routines can represent the beginning (e.g., start, initiation, etc.) of the lifetime of a context. The exit routines can represent the ending (e.g., termination, completion, etc.) of the context. For example, a first eBPF program can identify SSL_write operation entries and a second eBPF program can identify SSL_write operation exits. The first eBPF program and the second eBPF program can create a context by pairing data associated with the SSL_write with data associated with the SSL_read. As another example, a context between an entry of a send_network_data operation and an exit of the send_network_data operation can be created by pairing, via one or more eBPF programs, data from the entries with data from the exits.

When a lifetime of a first context begins during the lifetime of a second context, the first context and the second context can be correlated to one another. For example, a context for SSL_write operations can be correlated to a context for send_network_data operations if the lifetimes of both context are active. Since the contexts for send/receive routines (e.g., send_network_data operations, receive_network_data operations, etc.) will be active at the same time as the contexts for encrypt/decrypt routines (e.g., SSL_write operations, SSL_read operations, etc.), the contexts for each routine can be correlated to one another. Accordingly, the encrypt/decrypt data (e.g., plain text, unencrypted data, decrypted data, etc.) can be correlated to the send/receive cache.

Upon determining the correlations between the encrypt/decrypted data with the send/receive cache, the computer can retrieve a corresponding network socket handle. Once the network socket handle is retrieved from the send/receive cache, the computer can use the network socket handle to retrieve, from the connection cache, corresponding network connection data. As a result, the level 3/level 4 data and the in-the-clear data are both accessible to the computer.

Advantageously, by correlating the level 3/level 4 data with the in-the-clear data, the computer can have information which pertains to an entire communication session, which provides for a complete picture with respect to the communication session. Moreover, by generating these correlations, without the encryption keys and/or decryptions keys, the computer is not delayed in performing session analysis. Stated otherwise, the computer can begin to perform session analysis (e.g., generate key performance indicators (KPIs)), even in communication sessions that are using encryption or decryption keys unknown to the computer.

FIG. 1 is an illustration of a system 100 for correlating decrypted data with network connections, in accordance with an implementation. The system 100 may implement comprehensive session analysis by correlating level 3 (e.g., network layer data, such as source and destination IP address or protocol type, (e.g., TCP, UDP))/level 4 data (e.g., transport layer data, such as source and destination port numbers, sequence numbers (for TCP,), and/or checksums for error detection) with in-the-clear data (e.g., unencrypted data, decrypted data, etc.) for given communication sessions. In brief overview, the system 100 can include, access, or otherwise interface with one or more of a data processing system 110 (e.g., a probe, an inspection device), that receives and/or stores data packets transmitted via a network 105 between client devices 106*a-n* (hereinafter client device 106 or client devices 106) and service providers 108*a-n*. The service providers 108 can each include a set of one or more servers 502, depicted in FIG. 5A, or a data center 508. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

In some embodiments, the data processing system 110 may be executed by or otherwise implemented by at least one computing device 102. For example, the data processing system 110 may be included in the computing device 102. As another example, the computing device 102 and the data processing system 110 may be separate and/or otherwise discrete from one another. In some embodiments, the data processing system 110 may be nested, situated, or otherwise positioned between devices such that the data processing system 110 may intercept, detect, forward, or otherwise route one or more packets or data transmissions.

In some embodiments, the data processing system 110 may be attached or otherwise connected to at least one routines, function calls, sub-routines or other possible operating system actions regarding at least one of the client devices 106 or the service providers 108. For example, the data processing system 110 may be attached with the client devices 106 such that the data processing system 110 may detect when the client devices 106 (and/or an operating system of the client devices 106) perform one or more function calls. The data processing system 110 may detect, for example, when the client devices 106 perform a Secure Session Layer (SSL) write operation. As another example, the data processing system 110 may detect when the client devices 106 exit from a send_network_data operation (e.g., a data transmission function call).

Each of the computing device 102, the client devices 106, the service providers 108, and/or the data processing system 110 can include or utilize at least one processing unit or other logic device such as programmable logic array engine, or module configured to communicate with one another or other resources or databases. The components of the computing device 102, the client devices 106, the service providers 108, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The computing device 102, the client devices 106, the service providers 108, and/or the data processing system 110 can include or execute on one or more processors or computing devices (e.g., computing device 503 depicted in FIG. 5C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be a service provider that hosts different services or applications that can be accessed by computing devices, such as the computing device 102 and/or the client devices 106. The service provider 108 can be hosted by a third-party cloud service provider via a virtual environment, in some embodiments. The service provider 108 can be hosted in a public cloud, a co-location facility, or a private cloud, for example. The service provider 108 can be hosted in a private data center, or on one or more physical servers, virtual machines, or containers of an entity or customer. The service providers 108 may each be or include servers or computers configured to transmit or provide services across the network 105 to the client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data, or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 510 depicted in FIG. 5B.

The client device 106 can establish communication sessions with the service providers 108 to receive data from the service providers 108. For example, a user associated with the client device 106 may request a service. Responsive to the request, a service provider 108 associated with the service may send requested data to the client device 106 in a communication session. The client devices 106 may establish communication sessions with the service providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 510 depicted in FIG. 5B). If the client device 106 is deployed in a cloud 510, the client device 106 can include or be referred to as a virtual client device or virtual machine. In the event the client device 106 is deployed in a cloud 510, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 510 on the same computing host in an infrastructure 516 (described below with respect to FIG. 5B).

The data processing system 110 may comprise one or more processors that are configured to obtain network data packets from network 105 during a communication session between the client device 106 and the service providers 108. In some embodiments, the data processing system 110 may refer to and/or include a network monitoring device. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a function manager 124, a database 126, and/or a context tracker 128. The data processing system 110 may further include other components, managers, handlers, etc. to perform the techniques as described herein. In brief overview, the components 122-128 may monitor communication between the client device 106 and a network service provider (e.g., the service providers 108) to obtain information associated with the communication to correlate level 3 layer data, level 4 layer data, and/or in-the-clear data with one another.

The data collector 122 may comprise programmable instructions that, upon execution, cause the processor 118 to monitor one or more at least one of data transmissions, data packet exchanges, and/or executions of functions calls. For example, the data collector 122 may monitor exchanges between the client device 106 and the service provider 108. As another example, the data collector 122 may execute one or more modules to obtain information associated with the execution of function calls. In some embodiments, the data collector 122 may detect or otherwise collect network connection information and/or data. For example, the data collector 122 may detect information that indicates and/or otherwise identifies network sockets and/or network socket handlers. In some embodiments, upon detection or collection of network connection information, the data collector 122 may store or otherwise maintain the network connection information in one or more data caches. For example, the database 126 may refer to and/or represent one or more data caches.

In some embodiments, the network connection may include information associated with one or more layers or levels. For example, the network connection information may correspond to level 3 layer (e.g., network layer) communication. As another example, the network connection information may correspond to level 4 layer (e.g., transport layer) communication. In some embodiments, the network connection information may include, represent, and/or refer to at least one or more Internet Protocol (IP) addresses and/or one or more Transmission Control Protocol (TCP) ports. For example, the network connection information may include a list of IP addresses assigned to and/or that are being utilized on the network 105.

In some embodiments, the data collector 122 may monitor encrypted data packet exchanges. For example, the data collector 122 may monitor encrypted data packet exchanges between one or more clients and a server, between servers, or between clients. In some embodiments, a client may refer to a computer with a first IP address that initiates a session (e.g., a flow, communication, exchange, etc.) with a second computer having a second IP address. The data collector 122 may obtain (e.g., receive, collect) data transmitted between the client devices 106 and the service providers 108 as part of a communication session. For example, the client device 106 may send a request for a service to the service provider 108. The service provider 108 may send a response to provide the service to the client device 106. The data collector 122 may receive the request from the service provider 108. The request may be associated with a normal request for the service, or the request may be associated with a malicious attack.

The function manager 124 may comprise programmable instructions that, upon execution, cause the processor 118 to detect execution of one or more function calls. For example, the function manager 124 may detect when the client devices 106 execute function calls. The function manager 124 may detect execution of function calls by attaching or otherwise using at least one eBPF program. For example, the function manager 124 may execute or use an eBPF program within at least one of an instruction thread, a kernel, and/or a hardware/software interface of the client devices 106 such that the eBPF program detects when function calls are executed. As another example, the function manager 124 may attach an eBPF program between an opensource library and a network stack such that the eBPF detects when network transmission function calls are executed.

In some embodiments, the function manager 124 may detect one or more initiations and/or terminations of function calls. For example, the function manager 124 may detect an entry (e.g., an initiation) of an SSL_write operation (e.g., a function call). As another example, the function manager an exit (e.g., a termination) of an SSL_read operation. In some embodiments, the function manager 124 may detect one or more durations of times (e.g., lifetimes) for which function calls are active. As another example, a lifetime for an SSL function call (e.g., an SSL operation) may start at the entry (e.g., call) of the SSL_write operation and end at the exit (e.g., completion) of the SSL_write operation.

The context tracker 128 may comprise programmable instructions that, upon execution, cause the processor 118 to generate, detect, or create one or more contexts. In some embodiments, while one or more function calls are active (e.g., during their lifetimes), the context tracker 128 may detect one or more contexts. A context may refer to or include information collected or generated during lifetime of a function call, such as information between an entry and exit of a function call. As an example, a context may represent a collection of information that is collected, kept, or maintained prior to completion (e.g., exit) of a function call. For example, the context tracker 128 may detect a context between an entry of an SSL_write operation and an exit of the SSL_write operation. Stated otherwise, the context tracker 128 may correlate or otherwise associate the entry and the exit based on both of them corresponding to the same instance and/or occurrence of a function call.

While some examples described herein may make reference to functions and/or function calls, such as SSL_write operations and SSL_read operations, these examples are for illustrative purposely only and are in no way limiting. Stated otherwise, systems, methods, and processes described herein may implement functions and/or function calls from one or more software libraries, open source services, and/or compute platforms. For example, the data processing system 110 may implement functions, such as crypto/tls.(*Conn).Write and/or crypto/tls.(*Conn).Read functions from the Google Cloud Platform™ (GCP) or other open source offerings.

For instance, a context can be or include a specific instance of an event or function being traced. For example, when a function starts executing, an entry context can be created, and when it finishes, an exit context can be created. Contexts can be correlated when one context (e.g., a function call) starts during the lifetime of another context (e.g., another function call). This means that the context tracker 128 can track nested or overlapping events and understand their relationships.

In some embodiments, the context tracker 128 may track and/or otherwise maintain the context during the lifetime of the function call. For example, the context tracker 128 may maintain one or more pointers that route to (e.g., point to as an address) plain text data while an SSL_write operation is active. The context tracker 128 may detect or otherwise associate one or more contexts. For example, a first context may correspond to or be a lifetime for a given SSL_read operation. Stated otherwise, the first context can be active during performance of a function call (e.g., a context starts at an entry and the context ends at an exit). As another example, a second context may correspond to or be a lifetime for a given send_network_data operation.

Contexts can serve as a way to connect or otherwise correlate data with one another. For example, a context associated with utilization of a given network socket can be active at the same time as a context associated with execution of a function call. The context tracker 128 can correlate a first SSL_write operation with a first send_network_data operation given that the context for the SSL_write operation will be active during the context of the send_network_data operation. Stated otherwise, by tracking entries and exits of function calls (which form or otherwise define contexts), the context tracker 128 can detect one or more sets of information that are correlated to one another.

As an example, by tracking a context for a data transmission operation, the context tracker 128 can detect a network socket handle used for an underlying data packet that was transmitted during the data transmission operation. Given that the context for the data transmission operation terminates prior to a context for a corresponding SSL operation (e.g., a function call that triggered the data transmission operation), the context tracker 128 can keep the network socket handle to identify the corresponding SSL operation upon detection of an exit for the corresponding SSL operation. The context tracker 128 can identify the SSL operation, using the network socket handle, given that the exit of the SSL operation will return the network socket handle.

Once the context tracker 128 correlates, using the network socket handle, a data transmission operation with an SSL operation, the context tracker 128 can retrieve information from one or more data caches (e.g., the database 126). For example, the context tracker 128 can retrieve network connection information (e.g., level 3 layer data, level 4 layer data, etc.) using the network socket handle. In some embodiments, the context tracker 128 can retrieve or otherwise access one or more pointers (that route to plain text data) to retrieve the plain text data. For example, upon identification of the SSL operation (using the network socket handle), the context tracker 128 can use the context of the SSL operation to access a pointer that was identified in an entry of the SSL operation. Stated otherwise, an entry (e.g., a beginning of a context) can identify a pointer (which routes to plain text for encryption) and the context tracker 128 can use the context to identify the pointer.

In some embodiments, the context tracker 128 can correlate one or more sets of data and/or information. For example, the context tracker 128 can correlate plain text (e.g., in-the-clear data, unencrypted data, etc.) with network connection information. The context tracker 128 can correlate data using contexts for one or more function calls. For example, the context of a data transmission operation can return a network socket handle to the context tacker 128. The network socket handle can identify a network socket that was used to transmit an encrypted data packet (e . . . , a data packet that was transmitted as a result of the data transmission operation). In some embodiments, the context for an SSL operation (which triggered or caused the transmission of the encrypted data packet) can be active beyond or after the context of the data transmission operation. As a result, the context tracker 128 can use the transmission of the encrypted data packet (e.g., the context of the data transmission operation) to identify the SSL operation. Upon identification of the SSL operation, the context tracker 128 can correlate plain text (from the SSL operation) with network connection information.

As an example, the context tracker 128 can correlate plain text with network connection information using the network socket handle. The network socket handle can be tagged or otherwise flagged, within a connection cache, such that network connection information that pertains to the network socket handle is retrievable by the context tracker 128. Additionally, the context tracker 128 can correlate (e.g., pair, link, associate, etc.) with plain text by using the network socket handle to identify an SSL operation (whose context maintains a pointer to the plain text data). The network socket handle can identify the SSL operation given that an exit of a data transmission operation (which returns the network socket handle) occurs prior to an exit of the SSL operation. Once the exit of the SSL operation occurs, which will identify the network socket handle, the context tracker 128 can correlate the SSL operation to the data transmission operation using the network socket handle.

The data processing system 110 can use the correlated data to generate KPIs and/or alerts from data (e.g., the payloads and/or headers) of the data packets. Examples of KPIs include, but are not limited to, latency, number of connections, quality of the connections, volume of data transmitted, frequency of data packets transmission, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The data processing system 110 may generate the KPIs or alerts for individual communication sessions, geographical areas in which individual nodes that are communicating and receiving data across the network 105 are located, types of devices, etc.

The data processing system 110 may generate the KPIs or alerts based on data in the correlated data packets stored in the memory 120. For example, over time, the data processing system 110 can correlate data packets of a specific communication session using the systems and methods described herein. The correlation can enable the data processing system 110 to assign the data packets to the communication session, such as because the data processing system 110 can group the data packets that are matched to the same network socket handle, in some cases based on the data packets being transmitted within a time frame of the communication session. The data processing system 110 may retrieve a service that is configured to generate KPIs or alerts based on data packets collected for individual communication sessions.

The data processing system 110 can use the KPIs to adjust the network 110. For example, the data processing system 110 can transmit the KPIs generated from the correlated network packets to an operator of the self-organizing network. Based on the KPIs, the machine learning model of the self-organizing network can automatically adjust connections and configurations of network elements of network 105 to optimize network connections. For example, the self-organizing network or the data processing system 110 can block or throttle data packets transmitted from client devices of communication sessions for which the data processing system 110 or the self-organizing network determines the client devices are sending and/or receiving data packets at a frequency or average payload size above a threshold. The data processing system 110 may be able to do so, for example, by identifying data packets correlated with the same communication session (e.g., based on the data packets having matching layer 3 and/or layer 4 data), generating a frequency or average payload size of transmission KPI from the data packets, comparing the frequency or average payload size to a threshold, and either blocking or throttling network traffic from or both of the computing devices based on the frequency or average payload size exceeding the threshold. In some cases, the data processing system 110 can transmit an alert to the self-organizing network indicating the frequency exceeds the threshold and identifying the devices of the communication session. The self-organizing network can receive the alert and adjust the network or communications by either of the devices (e.g., throttle or block data packets transmitted by the devices of the communication session) in response to receiving the alert. The data processing system 110 can similarly adjust transmission of data packets across the network using KPIs generated from correlated data packets (e.g., correlated clear text with level 3 and/or level 4 data) of communication sessions in any way. Thus, the data processing system 110 can use the correlation to improve characteristics of the network, such as latency in communications across the network, reduce the resource load of managing the network, or reducing or stopping network attacks (e.g., denial-of-service attacks or distributed-denial-of-service attacks).

Figure 2:
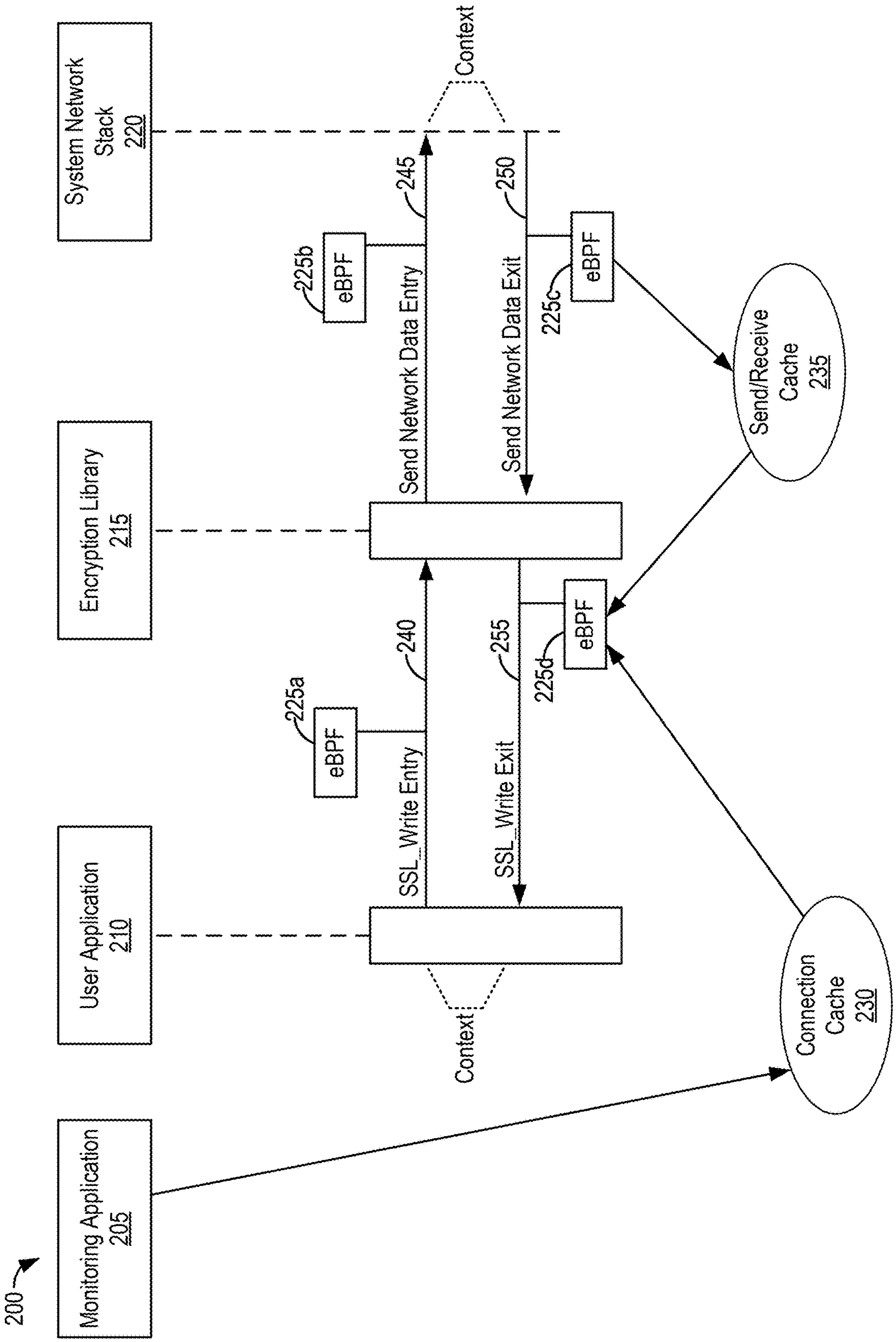
FIG. 2 is a system architecture for correlating decrypted data for one or more write operations with network connections, in accordance with an implementation.

FIG. 2 is a system architecture 200 for correlating decrypted data for one or more write operations with network connections, in accordance with an implementation. The system architecture 200 can be executed or implemented by a data processing system (the data processing system 110, shown and described with reference to FIG. 1). For example, the data processing system 110 may implement the system architecture 200 to correlate in-the-clear (e.g., plain text) with network connection information based on contexts associated with SSL_write operations and send_network_data operations. The system architecture 200 may include more or fewer operations and the operations may be performed in any order. Implementation of the system architecture 200 may enable the data processing system to correlate decrypted data with network connection information.

As shown in FIG. 2, the system architecture 200 includes a monitoring application 205, a user application 210, an encryption library 215, a system network stack 220, a connection cache 230, and a send/receive cache. In some embodiments, the system architecture 200 and/or one or more components thereof may be implemented by the system 100 and/or one or more portions thereof. For example, the user application 210 may be present or otherwise installed on the client devices 106.

In some embodiments, the monitoring application 205 may monitor, obtain, collect, or otherwise receive network connection information. For example, the monitoring application 205 may detect network connections across the network 105. As another example, the monitoring application 205 may detect one or more network socket handles. In some embodiments, the monitoring application 205 may store or maintain the network connection information in the connection cache 230. For example, the monitoring application 205 may store, in the connection cache 230, one or more strings of data that represent the network connection information. In some instances, the network connection information may refer to or include level 3 layer (e.g., network layer) data and/or level 4 layer (e.g., transport layer) data. In some embodiments, the database 126 may implement and/or otherwise include the connection cache 230.

In some embodiments, the data processing system 110 may implement or otherwise execute at least one eBPF program. For example, as shown in FIG. 2, the data processing system 110 has executed an eBPF program 225*a*, an eBPF program 225*b*, and eBPF program 225*c*, and an eBPF program 225*d*. In some embodiments, the eBPF programs 225 may be situated and/or positioned between one or more systems and/or interfaces of the system architecture 200. For example, the eBPF program 225*a* is shown positioned between the user application 210 and the encryption library 215 such that the eBPF program 225*a* may detect one or more function call entries. As another example, the eBPF program 225*b* is shown positioned between the encryption library 215 and the system network stack 220 such that the eBPF program 225*b* may detect one or more network data transmission operation entries. As another example, the eBPF program 225*c* is shown positioned between the encryption library 215 and the system network stack 220 such that the eBPF program 225*c* may detect one or more network data transmission operation exits. As another example, the eBPF program 224*d* is shown positioned between the encryption library 215 and the user application 210 such that the eBPF program 225*d* may detect one or more function call exits.

In some embodiments, at line 240, the eBPF program 225*a* may detect at least one SSL_write operation. For example, as shown in FIG. 2, the eBPF program 225*a* detects an entry (e.g., initiation, start, origination, etc.) of the SSL_write operation. In some embodiments, the SSL_write entry may be associated with an encrypted data packet. For example, the SSL_write entry may include or otherwise indicate plain text and/or unencrypted data for encryption by the encryption library 215. As another example, the SSL_write entry may include a pointer that maps to a location of the plain text within memory. In some embodiments, the data processing system 110 may maintain or otherwise store the pointers for subsequent retrieval of the plain text data.

In some embodiments, at line 245, the eBPF program 225*b* may identify one or more send_network_data operations. For example, as shown in FIG. 2, the eBPF program 225*b* identifies an entry of a network data transmission operation. In some embodiments, the entry of the network data transmission operation may result in the transmission of an encrypted data packet. For example, the entry of the network data transmission operation may result in the payload (from the SSL_write operation) being transmitted as an encrypted data packet.

In some embodiments, at line 250, the eBPF program 225*c* may detect one or more terminations of the send_network_data operations. For example, as shown in FIG. 2, the eBPF program 225*c* detects an exit of the network data transmission operation. In some embodiments, the eBPF program 225*c* may detect one or more exits of network data transmission operations whose entries were previously identified by the eBPF program 225*b*. Stated otherwise, the detection of entries, by the eBPF program 225*b*, and the detection of exits, by the eBPF program 225*c*, may form a context of network data transmission operations.

In some embodiments, the exit of the network data transmission operations may return one or more sets of information. For example, the exit of the send_network_data operation may return, to the eBPF program 225*c*, a network socket handle (e.g., an identifier of a network socket used for the network data transmission operation). In some embodiments, the data processing system 110 may store the network socket handle in the send/receive cache 235. The data processing system 110 may store the network socket handle such that the network socket handle is linked to one or more encrypted data packets. For example, the data processing system 110 may apply one or more tags or flags to the network socket handle. The tags or flags can indicate which network connection information, within the connection cache 230, corresponds to the network socket handle. Stated otherwise, the tags can map network socket handles to one or more segments of network connection information stored in the connection cache.

In some embodiments, at line 255, the eBPF program 225*d* may detect one or more terminations of one or more function calls. For example, as shown in FIG. 2, the eBPF program 225*d* detects an exit of the SSL_write operation whose entry was previously detected by the eBPF program 225*a*. In some embodiments, the detection of the SSL_write operation may trigger one or more actions or responses. For example, the eBPF program 225 detecting an exit of an SSL_write operation may cause (e.g., trigger) the data processing system 110 to retrieve one or more network socket handles from the send/receive cache 235. The data processing system 110 may use the network socket handle to retrieve network connection data from the connection cache 230.

In some embodiments, the eBPF program 225*d* may identify, based on information included in the exit of the SSL_write operation, a network socket handle associated with transmission (e.g., a data transmission operation) of an encrypted data packet. Upon identifying the network socket handle, in the exit of the SSL_write operation, the eBPF program 225*d* can correlate plain text data with level 3/level 4 layer data. For example, the context, created by the entry and exit of the SSL_write operation can maintain a pointer to the plain text data. As another example, the network socket handle can As described herein, the lifetime (e.g., duration between an entry and an exit) can define or create a context. For example, the SSL_write entry at line 240 and the SSL_write exit at line 255 may form a context. Moreover, the lifetime of the context for the SSL_write operation is shown, in FIG. 2, to start prior to and end after the lifetime of the context for the send_network_data operation. Accordingly, the data processing system 110 may correlate or otherwise associate the two contexts such that underlying data/information may be correlated.

As an example, the network socket handle (returned in the exit of the network data transmission operation) can be used to retrieve network connection information. Moreover, the network socket handle can be used to identify an underlying encrypted data packet. In this example, the lifetime of the SSL_write operation is still active and as a result the plain text pointer is still accessible. Stated otherwise, given that the lifetime associated with transmitting an encrypted data packet is completed prior to the lifetime of an underlying function call (e.g., an SSL_write operation) the plain text data and the network connection can be correlated by maintaining a record of pointers (during the lifetime of the function call) and retrieving a network socket handle associated with the exit of the network data transmission operation.

Figure 3:
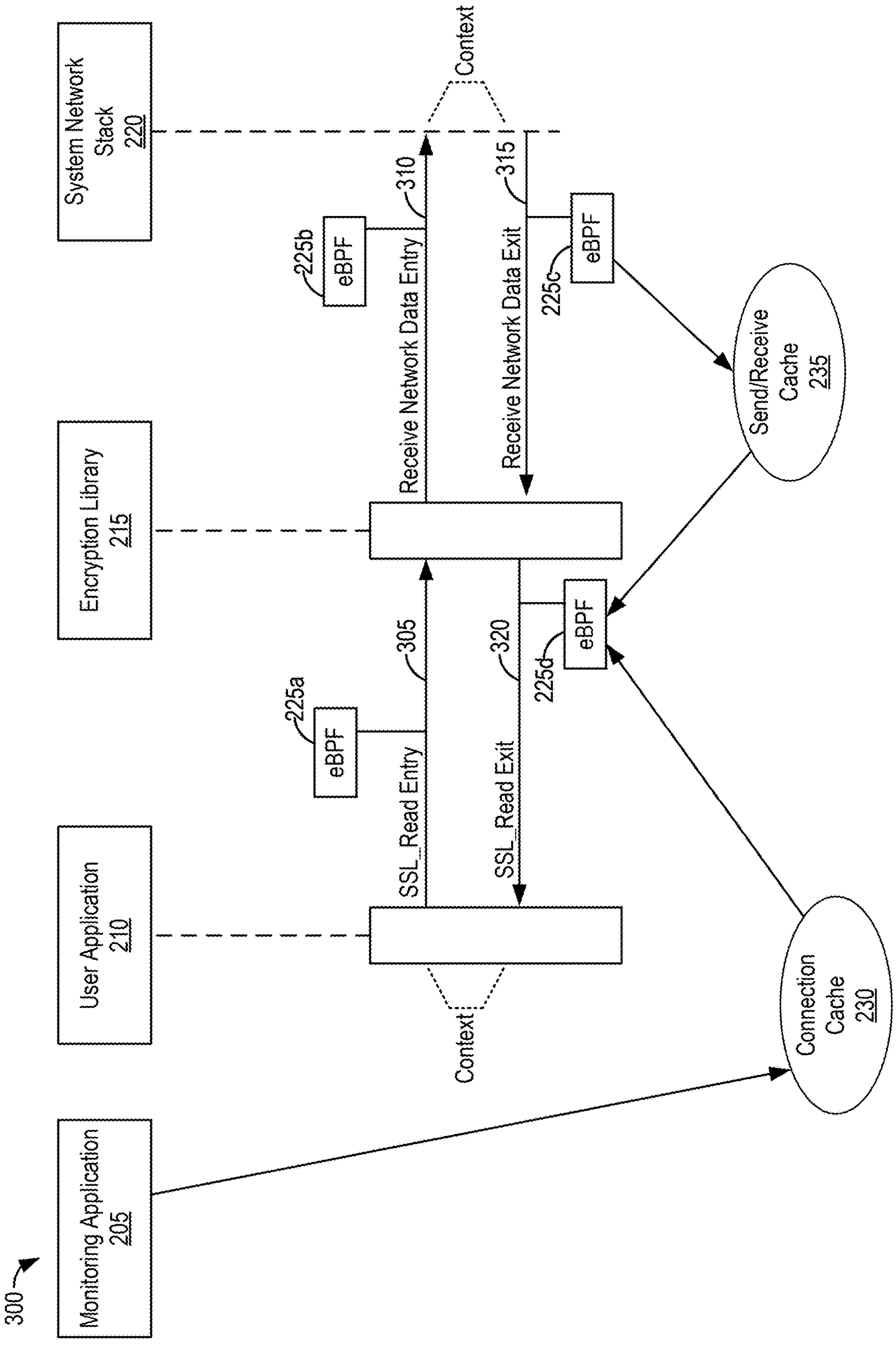
FIG. 3 is a system architecture for correlating decrypted data for one or more read operations with network connections, in accordance with an implementation.

FIG. 3 is a system architecture 300 for correlating decrypted data for one or more read write operations with network connections, in accordance with an implementation. The system architecture 300 can be executed or implemented by a data processing system (the data processing system 110, shown and described with reference to FIG. 1). For example, the data processing system 110 may implement the system architecture 300 to correlate in-the-clear (e.g., plain text) with network connection information based on contexts associated with SSL_read operations and receive_network_data operations. The system architecture 300 may include more or fewer operations and the operations may be performed in any order. Implementation of the system architecture 300 may enable the data processing system to correlate decrypted data with network connection information.

In some embodiments, the system architecture 300 may refer to or include the system architecture 200. For example, the system architecture 300 may represents an example of the system architecture 200 for which an SSL_read operation (e.g., function call) is detected instead of an SSL_write operation.

In some embodiments, at line 305, the eBPF program 225*a* may detect one or more SSL_read operations. For example, the eBPF program 225*a* may detect an entry (e.g., an initiation) of the SSL_read operation. In some embodiments, the detection of the entry of the SSL_read operation may initiate or otherwise create a context or lifetime of the context. The SSL_read operation may include a function call that prompts or inquiries, the system network stack 220, for one or more data packets.

In some embodiments, at line 310, the eBPF program 225*b* may detect an initiation of one or more receive network data operations. For example, the eBPF program 225*b* may detect an entry of a receive_network_data operation. Stated otherwise, the eBPF program 225*b* may detect transmission of a request to the system network stack 220.

In some embodiments, at line 315, the eBPF program 225*c* may detect a termination of one or more receive network data operations. For example, the eBPF program 225*c* may detect an exit of the receive_network_data operation whose entry was previously detected by the eBPF program 225*c*. In some embodiments, the detection of the exit of the receive_network_data operation may indicate a completion of a data transmission operation. For example, the exit of the receive_network_data operation can return a network socket handle that identifies a network socket used to transmit a data packet. The eBPF program 225*c* can store the network socket handle in the send/receive cache 235.

In some embodiments, at line 320, the eBPF program 225*d* may detect a termination of one or more SSL_read operations. For example, the eBPF program 225*d* may detect an exit of the SSL_read operation previously detected by the eBPF program 225*a*. In some embodiments, the exit of the SSL_read operation may return or otherwise indicate a pointer to the plain text that was decrypted by the encryption library 215. The data processing system 110 can, based on the context associated with the SSL_write operation and the context associated with the receive_network_data operation, correlate in-the-clear data (e.g., plain text, unencrypted data, decrypted data, etc.) with network connection data using the network socket handle.

As an example, the data processing system 110 can use the network socket handle (associated with the receipt of the encrypted data packet) to retrieve, from the connection cache 230, network connection information. Moreover, the data processing system 110 can use the network socket handle to identify an underlying encrypted data packet. The data processing system 110 can, given that the context associated with reading the encrypted data packet (e.g., SSL_read) is active during the context of the receive_network_data operation, obtain the pointer for the plain text data such that the data processing system 110 has access to the plain text (e.g., a payload) and the network connection data.

Figure 4:
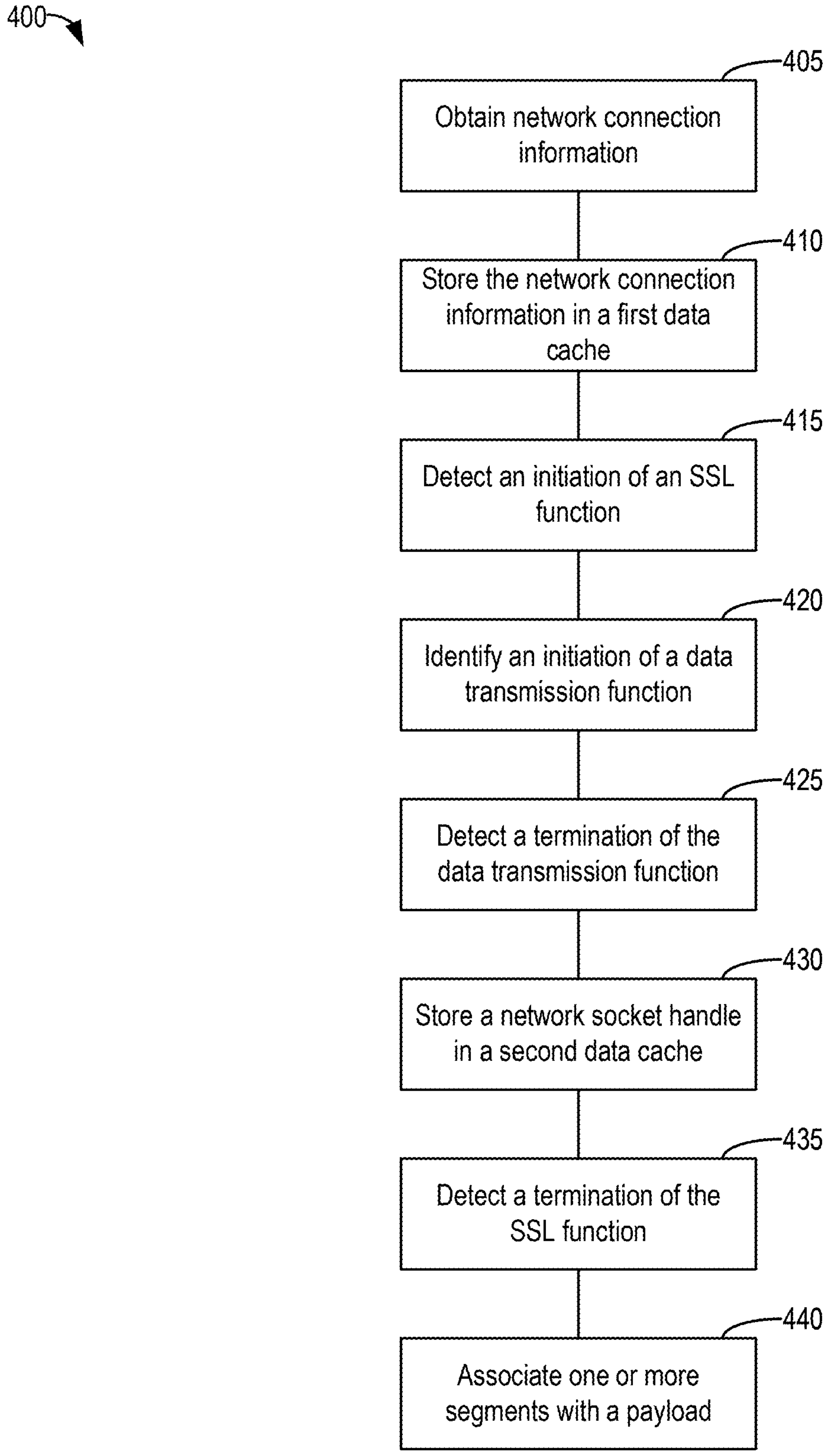
FIG. 4 is a method for correlating decrypted data with network connections, in accordance with an implementation.

FIG. 4 is a method 400 for correlating decrypted data with network connections, in accordance with an implementation. The method 400 can be performed by one or more systems, components, or modules depicted in FIGS. 1 and/or 5A-5C, including, for example, a data processing system or service of a cloud service provider system. The method 400 and/or one or more operations thereof may be performed responsive to execution of at least one eBPF program. The method 400 may include more or fewer operations and the operations may be performed in any order. Performance of the method 400 may enable the data processing system to detect utilization of one or more proxy devices by client devices connecting with a destination.

At operation 405, the data processing system obtains network connection information. For example, the data processing system can obtain level 3 layer data (e.g., network layer data, such as source and destination IP address or protocol type, (e.g., TCP, UDP)). As another example, the data processing system can obtain level 4 layer data (e.g., transport layer data, such as source and destination port numbers, sequence numbers (for TCP,), and/or checksums for error detection). In some embodiments, the data processing system can obtain the network connection information by implementing or otherwise executing a monitoring application.

At operation 410, the data processing system stores the network connection information in a first data cache. For example, the data processing system may store, in the first data cache, the network connection information as one or more data strings. As another example, the data processing system may store the network connection information as one or more data arrays. In some embodiments, the data processing system may store the network connection information in a connection cache.

At operation 415, the data processing system detects an initiation of an SSL function. For example, the data processing system can detect an initiation of an SSL_write operation. As another example, the data processing system can detect an entry of an SSL_read operation. In some embodiments, the SSL function can be associated with an encrypted data packet. For example, the SSL function can include a pointer to plain text which is to be encrypted by an encryption library. As another example, the SSL function can include a request for an encrypted data packet.

At operation 420, the data processing system identifies an initiation of a data transmission function. For example, the data processing system may identify an entry of a send_network_data operation. As another example, the data processing system may identify an entry of a receive_network_data operation. In some embodiments, initiation of the data transmission function may result in at least one of (i) a transmission of an encrypted data packet to a network stack or (ii) receipt of the encrypted data packet from the network stack.

At operation 425, the data processing system detects a termination of the data transmission function. For example, the data processing system may detect an exit of the data transmission function that was initiated in operation 420. As another example, the data processing system may receive one or more sets of information from a network stack. In some embodiments, the exit (e.g., termination) of the data transmission function may return one or more sets of information. For example, the data processing system may receive a network socket handle that was associated with the data transmission function.

At operation 430, the data processing system stores the network socket handle in a second data cache. The network socket handle may refer to or include an identification or an identifier for a network socket. Stated otherwise, the network socket handle can identify a given network socket. For example, the data processing system can store the network socket handle in a send/receive cache. In some embodiments, the network socket handle may be linked to an encrypted data packet. For example, the network socket handle may identify a network socket for which the encrypted data packet was transmitted at and/or received at.

At operation 435, the data processing system detects a termination of the SSL function. For example, the data processing system may detect an exit of the SSL function whose entry was detected in operation 415. As another example, the data processing system may detect an exit of an SSL_write operation. In some embodiments, the data processing system may perform one or more retrievals responsive to the termination of the SSL function. For example, the data processing system may retrieve, from the send/receive cache, the network socket handle associated with the encrypted data packet. As another example, the data processing system may retrieve, using the network socket handle, and from the connection cache, one or more segments of network connection information.

At operation 440, the data processing system may associate one or more segments with a payload. For example, the data processing system may associate one or more segments of network connection information with plain text data. In some embodiments, the data processing system may associate the segments with the payload based on one or more contexts. For example, a context or a lifetime of a context for an SSL operation may be active prior to and after a context for a network data transmission operation. The data processing can associate the SSL with operation with the network data operation using the network socket handle. For example, the network socket handle can identify a given encrypted data packet. Upon identification of the encrypted data packet, the data processing system can identify an underlying SSL operation. Stated otherwise, upon receipt of a network socket handle, the data processing system can correlate network connection information (which was retrieved using the network socket handle as a key) and in-the-clear data (which was obtained using a pointer that was kept during the context of an SSL operation).

Implementing the systems and methods described herein has several advantages. For example, the systems and method allow for monitoring encrypted network traffic by recreating the decrypted data as though it were natively transmitted in the clear over the network. The systems and methods are protocol agnostic and can work with TLS and DTLS generically, regardless of version, and other encryption protocols. If a user application can acquire the decrypted data and there are known encrypt/decrypt and send/receive routines to hook into, the described implementations are compatible. The systems and methods capture in-the-clear data when the user application sends/receives the data. This minimizes capture latency. Since the implementations do not actually perform decryption, the systems and methods may not require end user private keys, thereby eliminating potential security risks.

Moreover, a computer implementing the systems and methods described herein can allow encrypted network traffic monitoring at the endpoint, in a self-contained virtual environment (e.g., Kubernetes) without requiring the client to provide their decryption key. The computer can do so without scanning any network packets related to the encrypted data stream, which enables the computer to monitor encrypted network traffic without seeing the initial handshake. This benefit is useful for monitoring long life secure traffic connections, since those encrypted connections have already been running prior to the monitoring software. The OS goes to great lengths to keep connection data out of the user's way, and eBPF technology is restricted in what data it can access from the kernel. Therefore, accessing connection data from eBPF can require bridging the two sides together, which is a problem solved by the systems and methods described herein by tying in-the-clear data with a network connection.

Figure 5A:
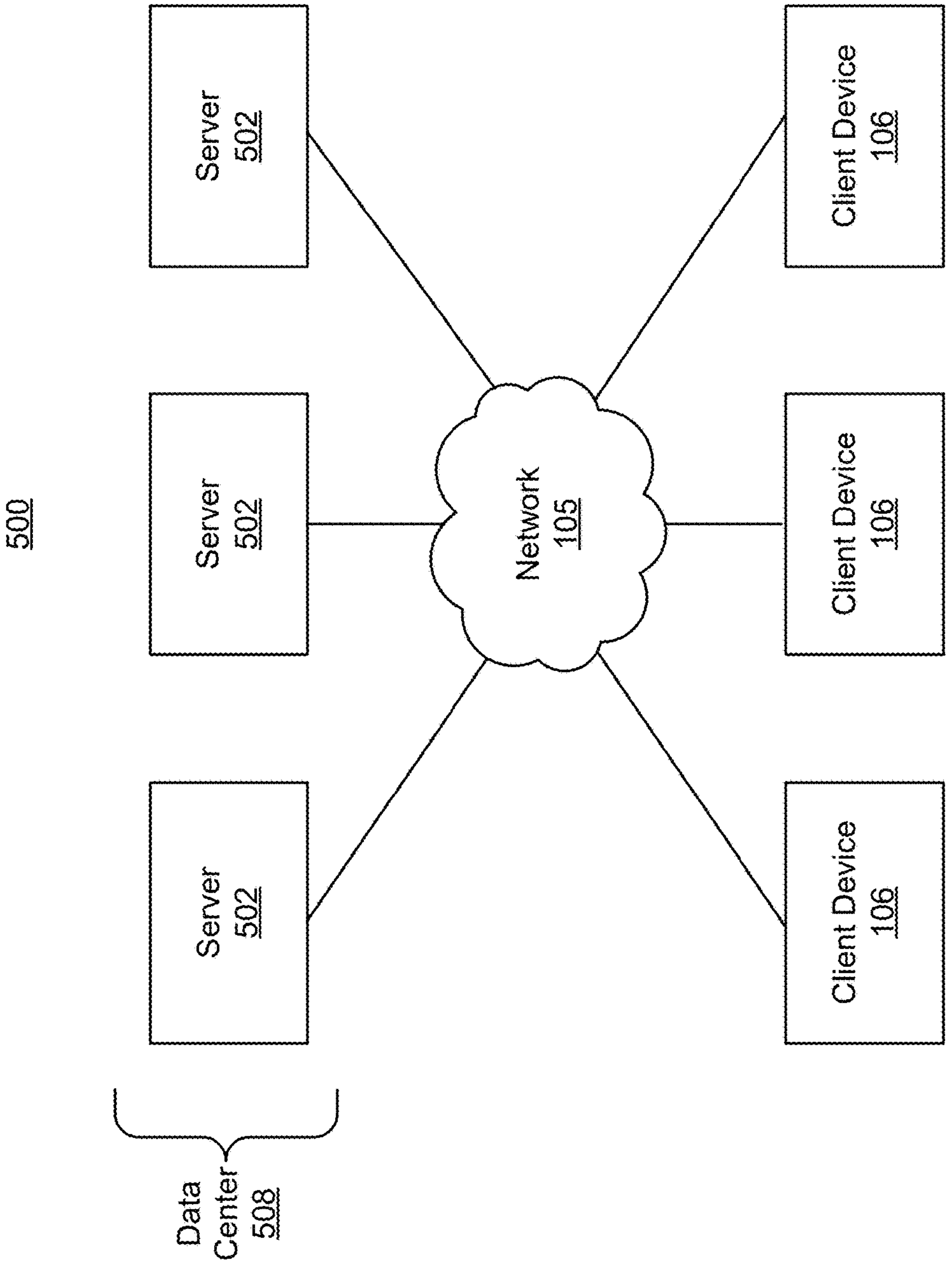
FIG. 5A is a block diagram depicting an implementation of a network environment including a client device in communication with a server device, in accordance with an implementation.

FIG. 5A depicts an example network environment that can be used in connection with the methods and systems described herein. In brief overview, the network environment 500 includes one or more client devices 106 (also generally referred to as clients, client node, client machines, client computers, client computing devices, endpoints, or endpoint nodes) in communication with one or more servers

502 (also generally referred to as servers, nodes, or remote machine) via one or more networks 105. In some embodiments, the client device 106 has the capacity to function as both a client node seeking access to resources provided by a server and as a server providing access to hosted resources for other client devices 106.

Although FIG. 5A shows the network 105 between the client devices 106 and the servers 502, the client devices 106 and the servers 502 can be on the same network 105. In embodiments, there are multiple networks 105 between the client devices 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines can operate according to one type of operating system platform (e.g., WINDOWS NT, manufactured by Microsoft Corp. of Redmond, Washington), while one or more of the other servers 502 can operate on according to another type of operating system platform (e.g., Unix, Linux, or Mac OS X)). The servers 502 of each data center 508 do not need to be physically proximate to another server 502 in the same machine farm. Thus, the group of servers 502 logically grouped as the data center 508 can be interconnected using a network. Management of the data center 508 can be de-centralized. For example, one or more servers 502 can comprise components, subsystems, and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
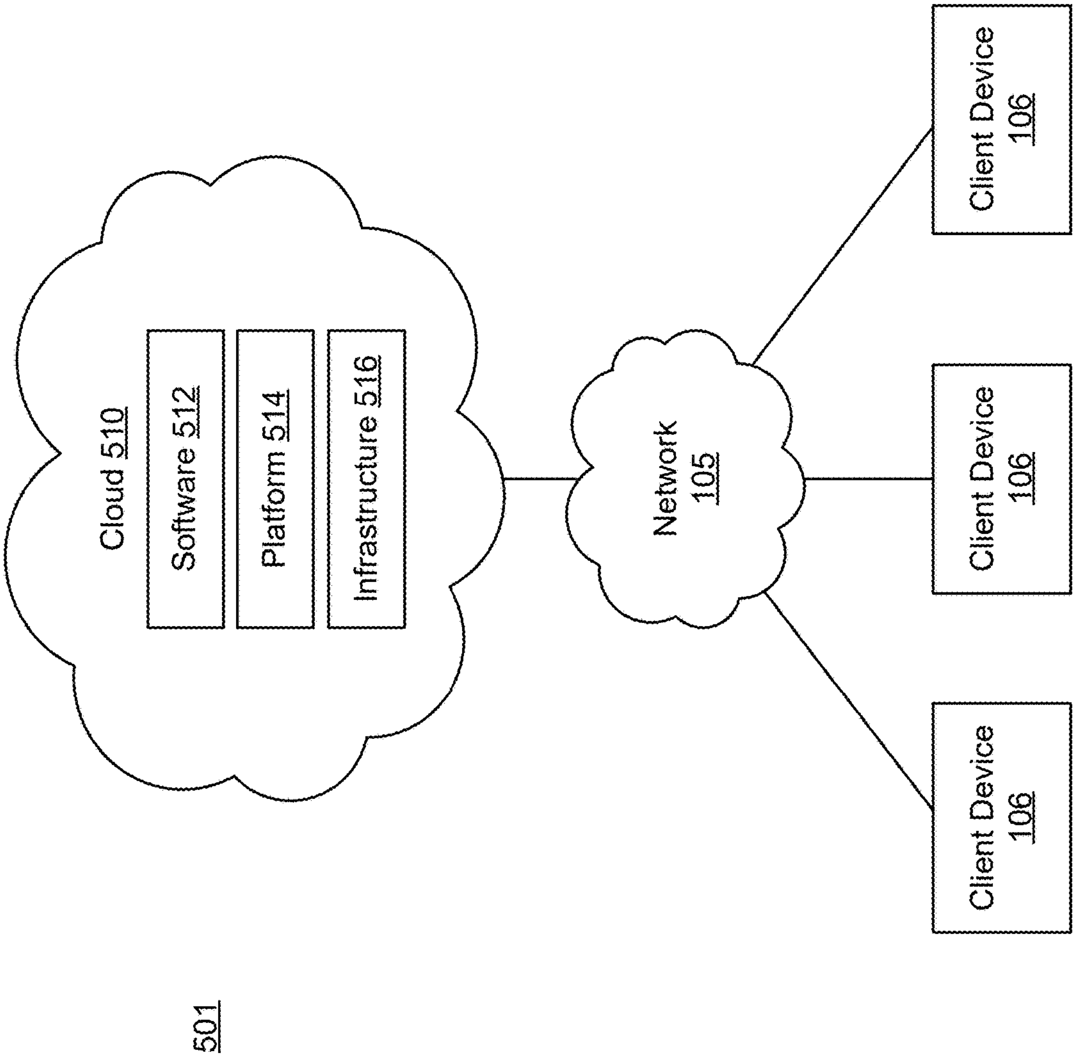
FIG. 5B is a block diagram depicting a cloud computing environment including a client device in communication with cloud service providers, in accordance with an implementation.

FIG. 5B illustrates an example cloud computing environment. A cloud computing environment 501 can provide the client device 106 with one or more resources provided by a network environment. The cloud computing environment 501 can include one or more client devices 106, in communication with the cloud 510 over one or more networks 105. Client devices 106 can include, e.g., thick clients, thin clients, and zero clients. A thick client can provide at least some functionality even when disconnected from the cloud 510 or the servers 502. A thin client or a zero client can depend on the connection to the cloud 510 or the server 502 to provide functionality. A zero client can depend on the cloud 510 or other networks 105 or the servers 502 to retrieve operating system data for the client device. The cloud 510 can include back-end platforms, e.g., the servers 502, storage, server farms or data centers.

The cloud 510 can be public, private, or hybrid. Public clouds can include public servers 502 that are maintained by third parties to the client devices 106 or the owners of the clients. The servers 502 can be located off-site in remote geographical locations as disclosed above or otherwise. Public clouds can be connected to the servers 502 over a public network. Private clouds can include private servers 502 that are physically maintained by client devices 106 or owners of clients. Private clouds can be connected to the servers 502 over a private network 105. Hybrid clouds can include both the private and public networks 105 and servers 502.

The cloud 510 can also include a cloud-based delivery, e.g., Software as a Service (Saas) 512, Platform as a Service (PaaS) 514, and the Infrastructure as a Service (IaaS) 516. IaaS can refer to a user renting the use of infrastructure resources that are needed during a specified time period. IaaS providers can offer storage, networking, servers, or virtualization resources from large pools, allowing the users to quickly scale up by accessing more resources as needed. PaaS providers can offer functionality provided by IaaS, including, e.g., storage, networking, servers, or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL), DTLS (Datagram Transport Layer Security), or other transmission mechanisms.

The client device 106 and the server 502 can be deployed as and/or executed on any type and form of computing device, e.g., a computer, network device or appliance capable of communicating on any type and form of network and performing the operations described herein.

Figure 5C:
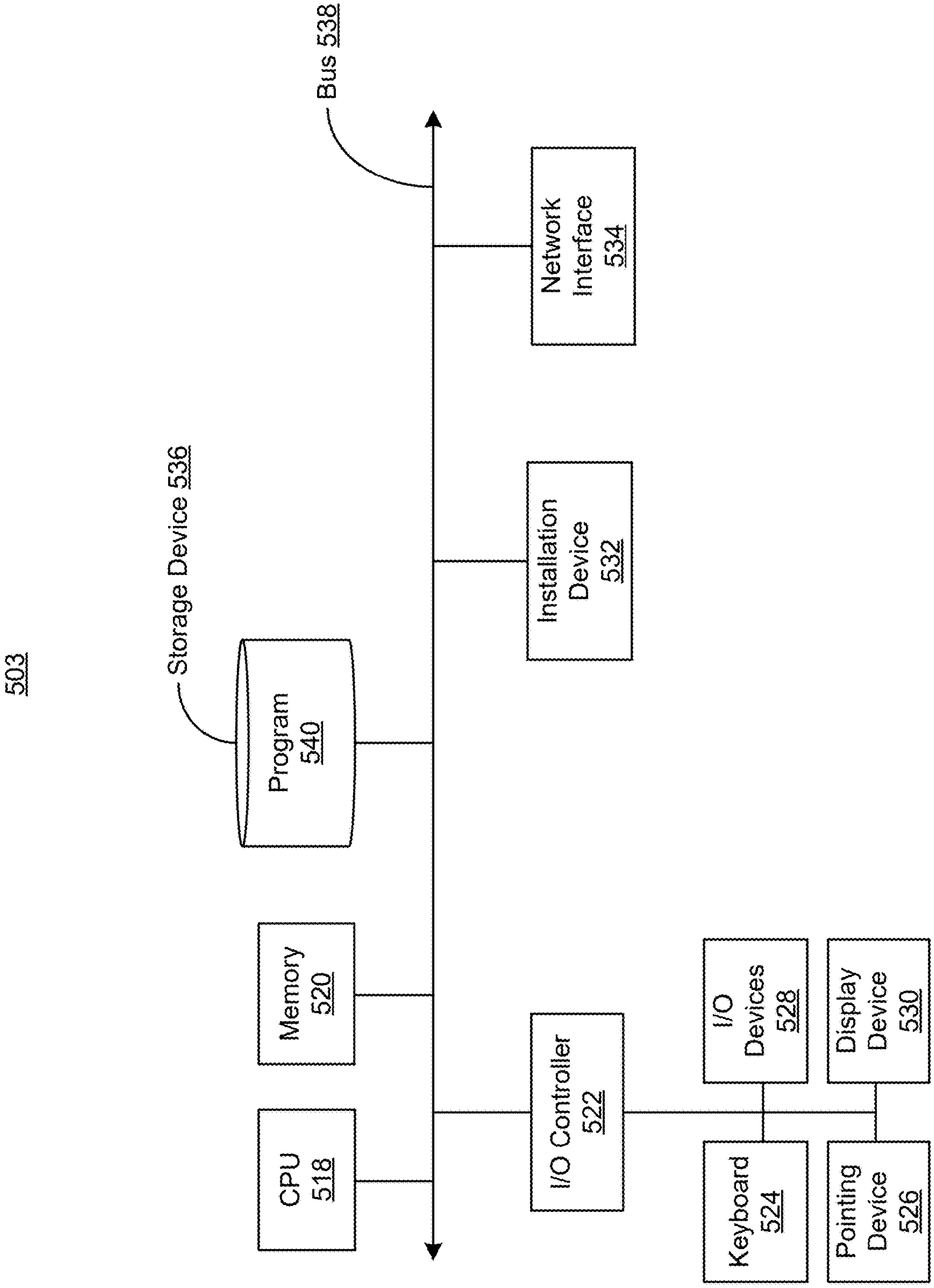
FIG. 5C is a block diagram depicting an implementation of a computing device that can be used in connection with the system depicted in FIG. 1, and the methods and processes depicted in FIGS. 2-4, in accordance with an implementation.

FIG. 5C depict a block diagram of the computing device 503 useful for practicing an embodiment of the client device 106 or the server 502. As shown in FIG. 5C, each computing device 503 can include a central processing unit 518, and a main memory unit (shown as memory 520). The computing device 503 can include one or more of a storage device 536, an installation device 532, a network interface 534, an input/output (I/O) controller 522, a display device 530, a keyboard 524, a pointing device 526 (e.g., a mouse), and an I/O device 528. The storage device 536 can include, without limitation, a program 540, such as an operating system, software, or software associated with system 100.

The central processing unit 518 is any logic circuitry that responds to, and processes instructions fetched from memory 520. The central processing unit 518 can be provided by a microprocessor unit, e.g., those manufactured by Intel Corporation of Mountain View, California. The computing device 503 can be based on any of these processors, or any other processor capable of operating as described herein. The central processing unit 518 can utilize instruction level parallelism, thread level parallelism, different levels of cache, and multi-core processors. A multi-core processor can include two or more processing units on a single computing component.

Memory 520 can include one or more memory chips capable of storing data and allowing any storage location to be directly accessed by the central processing unit 518. Memory 520 can be volatile and faster than storage device 536. Memory 520 can be Dynamic random-access memory (DRAM) or any variants, including static random access memory (SRAM). Memory 520 or the storage device 536 can be non-volatile; e.g., non-volatile read access memory (NVRAM). Memory 520 can be based on any type of memory chip, or any other available memory chips. In the example depicted in FIG. 5C, the central processing unit 518 can communicate with memory 520 via a system bus 538.

The I/O device 528 can be present in the computing device 503. The I/O device 528 can include keyboards, mice, trackpads, trackballs, touchpads, touch mice, multi-touch touchpads and touch mice, microphones, multi-array microphones, drawing tablets, cameras, or other sensors. The I/O device 528 include video displays, graphical displays, speakers, headphones, or printers.

The I/O device 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. The I/O device 528, the display device 530, or a group of devices can be augmented reality devices. The I/O devices can be controlled by the I/O controller 522 as shown in FIG. 5C. The I/O controller 522 can control one or more I/O devices, such as, e.g., the keyboard 524 and the pointing device 526, e.g., a mouse or optical pen. Furthermore, an I/O device can also provide storage and/or the installation device 532 for the computing device 503. In embodiments, the computing device 503 can provide USB connections (not shown) to receive handheld USB storage devices. In embodiments, the I/O device 528 can be a bridge between the system bus 538 and an external communication bus, e.g., a USB bus, a SCSI bus, a Fire Wire bus, an Ethernet bus, a Gigabit Ethernet bus, a Fiber Channel bus, or a Thunderbolt bus.

In embodiments, the display device 530 can be connected to the I/O controller 522. Display devices can include, e.g., liquid crystal displays (LCD), electronic papers (e-ink) displays, flexile displays, light emitting diode displays (LED), or other types of displays. In some embodiments, the display device 530 or the I/O controller 522 can be controlled through or have hardware support for OPENGL or DIRECTX API or other graphics libraries. Any of the I/O device 528 and/or the I/O controller 522 can include any type and/or form of suitable hardware, software, or combination of hardware and software to support, enable or provide for the connection and use of one or more display devices (e.g., the display device 530) by the computing device 503. For example, the computing device 503 can include any type and/or form of video adapter, video card, driver, and/or library to interface, communicate, connect, or otherwise use the display devices 530. In embodiments, a video adapter can include multiple connectors to interface to multiple display devices (e.g., the display device 530).

The computing device 503 can include the storage device 536 (e.g., one or more hard disk drives or redundant arrays of independent disks) for storing an operating system or other related software, and for storing application software programs (e.g., the program 540) such as any program related to the systems, methods, components, modules, elements, or functions depicted in FIG. 1. Examples of the storage device 536 include, e.g., hard disk drive (HDD); optical drive including CD drive, DVD drive, or BLU-RAY drive; solid-state drive (SSD); USB flash drive; or any other device suitable for storing data. The storage device 536 can include multiple volatile and non-volatile memories, including, e.g., solid state hybrid drives that combine hard disks with solid state cache. The storage device 536 can be non-volatile, mutable, or read-only. The storage device 536 can be internal and connect to the computing device 503 via the system bus 538. The storage device 536 can be external and connect to the computing device 503 via the I/O device 528 that provides an external bus. The storage device 536 can connect to the computing device 503 via the network interface 534 over a network 105. Some client devices 106 may not require a non-volatile device (e.g., the storage device 536) and can be thin clients or zero client devices 106. The storage device 536 can be used as the installation device 532 and can be suitable for installing software and programs.

The computing device 503 can include the network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 503 can communicate with other computing devices via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 534 can include a built-in network adapter, network interface card, PCMCIA network card, EXPRESSCARD network card, card bus network adapter, wireless network adapter, USB network adapter, modem, or any other device suitable for interfacing the computing device 503 to any type of network capable of communication and performing the operations described herein.

The computing device 503 can operate under the control of an operating system, which controls scheduling of tasks and access to system resources. The computing device 503 can be running any operating system configured for any type of computing device, including, for example, a desktop operating system, a mobile device operating system, a tablet operating system, or a smartphone operating system.

The computing device 503 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 503 has sufficient processor power and memory capacity to perform the operations described herein. In some embodiments, the computing device 503 can have different processors, operating systems, and input devices consistent with the device.

In some embodiments, the status of one or more of the client devices 106 and/or the computing device 503, in the network 105, can be monitored as part of network management. In embodiments, the status of a machine can include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 503 in response to the central processing unit 518 executing an arrangement of instructions contained in memory 520. Such instructions can be read into memory 520 from another computer-readable medium, such as the storage device 536. Execution of the arrangement of instructions contained in memory 520 causes the computing device 503 to perform the illustrative processes described herein. One or more processors in a multi-processing arrangement may also be employed to execute the instructions contained in memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5A, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a system. The system can include one or more memory devices. The one or more memory devices can store instructions thereon. The instructions can, when executed by one or more processors, cause the one or more processors to obtain, responsive to an establishment of a connection with a network, network connection information associated with communication across the network. A plurality of computing devices and a server can communicate via the network. The instructions can cause the one or more processors to store the network connection information in a first data cache. One or more respective segments of the network connection information can be retrievable, from the first data cache, using a corresponding network socket handle. The instructions can cause the one or more processors to detect, via a first Extended Berkeley Packet Filter (eBPF) program, an initiation of a Secure Sockets Layer (SSL) function. The SSL function can be initiated by a first computing device of the plurality of computing devices. The SSL function can be associated with an encrypted data packet having a payload. The instructions can cause the one or more processors to identify, responsive to the initiation of the SSL function, via a second eBPF program, an initiation of data transmission function that results in (i) a transmission of the encrypted data packet to a network stack or (ii) receipt of the encrypted data packet from the network stack. The instructions can cause the one or more processors to detect, via a third eBPF program, a termination of the data transmission function. The termination of the data transmission function can return a network socket handle utilized during the data transmission function. The instructions can cause the one or more processors to store the network socket handle in a second data cache. The network socket handle can be linked, in the second data cache, to the encrypted data packet. The instructions can cause the one or more processors to detect, via a fourth eBPF program, a termination of the SSL function. Detection of the termination of the SSL function can trigger a first retrieval, from the second data cache, of the network socket handle and a second retrieval, from the first data cache using the network socket handle, one or more segments of the network connection information. The instructions can cause the one or more processors to associate the one or more segments of the network connection information with the payload based on a context of the SSL function.

At least one aspect is directed to a method. The method can include obtaining, by one or more processing circuits, responsive to an establishment of a connection with a network, network connection information associated with communication across the network. A plurality of computing devices and a server can communicate via the network. The method can include storing, by the one or more processing circuits, the network connection information in a first data cache. One or more respective segments of the network connection information can be retrievable, from the first data cache, using a corresponding network socket handle. The method can include detecting, by the one or more processing circuits, via a first Extended Berkeley Packet Filter (eBPF) program, an initiation of a Secure Sockets Layer (SSL) function. The SSL function can be initiated by a first computing device of the plurality of computing devices. The SSL function can be associated with an encrypted data packet having a payload. The method can include identifying, by the one or more processing circuits, responsive to the initiation of the SSL function, via a second eBPF program, an initiation of data transmission function that results in (i) a transmission of the encrypted data packet to a network stack or (ii) receipt of the encrypted data packet from the network stack. The method can include detecting, by the one or more processing circuits, via a third eBPF program, a termination of the data transmission function. The termination of the data transmission function can return a network socket handle utilized during the data transmission function. The method can include storing, by the one or more processing circuits, the network socket handle in a second data cache. The network socket handle can be linked, in the second data cache, to the encrypted data packet. The method can include detecting, by the one or more processing circuits, via a fourth eBPF program, a termination of the SSL function. Detection of the termination of the SSL function can trigger a first retrieval, from the second data cache, of the network socket handle and a second retrieval, from the first data cache using the network socket handle, one or more segments of the network connection information. The method can include associating, by the one or more processing circuits, the one or more segments of the network connection information with the payload based on a context of the SSL function.

At least one aspect is directed to a non-transitory computer readable storage medium. The non-transitory computer readable storage medium can include instructions stored thereon. The instructions can, when executed by one or more processors, cause the one or more processors to perform operations that include obtaining, responsive to an establishment of a connection with a network, network connection information associated with communication across the network. A plurality of computing devices and a server communicate via the network. The operations can include storing the network connection information in a first data cache. One or more respective segments of the network connection information can be retrievable, from the first data cache, using a corresponding network socket handle. The operations can include detecting, via a first Extended Berkeley Packet Filter (eBPF) program, an initiation of a Secure Sockets Layer (SSL) function. The SSL function can be initiated by a first computing device of the plurality of computing devices. The SSL function can be associated with an encrypted data packet having a payload. The operations can include identifying, responsive to the initiation of the SSL function, via a second eBPF program, an initiation of data transmission function that results in (i) a transmission of the encrypted data packet to a network stack or (ii) receipt of the encrypted data packet from the network stack. The operations can include detecting, via a third eBPF program, a termination of the data transmission function. The termination of the data transmission function can return a network socket handle utilized during the data transmission function. The operations can include storing the network socket handle in a second data cache. The network socket handle can be linked, in the second data cache, to the encrypted data packet. The operations can include detecting, via a fourth eBPF program, a termination of the SSL function. Detection of the termination of the SSL function can trigger a first retrieval, from the second data cache, of the network socket handle and a second retrieval, from the first data cache using the network socket handle, one or more segments of the network connection information. The operations can include associating the one or more segments of the network connection information with the payload based on a context of the SSL function.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file on a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B.' Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising one or more memory devices storing instructions thereon that, when executed by one or more processors, cause the one or more processors to:

obtain, responsive to an establishment of a connection with a network, network connection information associated with communication across the network, wherein a plurality of computing devices and a server communicate via the network;

store the network connection information in a first data cache, wherein one or more respective segments of the network connection information are retrievable, from the first data cache, using a corresponding network socket handle;

detect, via a first Extended Berkeley Packet Filter (eBPF) program positioned between a user application and an encryption library, an initiation of a Secure Sockets Layer (SSL) function, wherein the SSL function is initiated by a first computing device of the plurality of computing devices, and wherein the SSL function is associated with an encrypted data packet having a payload;

identify, responsive to the initiation of the SSL function, via a second eBPF program positioned between the encryption library and a network stack, an initiation of a data transmission function that is distinct from the SSL function and that results in (i) a transmission of the encrypted data packet to the network stack or (ii) receipt of the encrypted data packet from the network stack;

detect, via a third eBPF program positioned between the encryption library and the network stack, a termination of the data transmission function, wherein the termination of the data transmission function returns a network socket handle utilized during the data transmission function;

store the network socket handle in a second data cache, wherein the network socket handle is linked, in the second data cache, to the encrypted data packet;

detect, via a fourth eBPF program positioned between the encryption library and the user application, a termination of the SSL function, wherein detection of the termination of the SSL function triggers:

a first retrieval, from the second data cache, of the network socket handle; and a second retrieval, from the first data cache using the network socket handle, one or more segments of the network connection information; and associate the one or more segments of the network connection information with the payload based on a context of the SSL function;

wherein a context of the data transmission function terminates prior to the context of the SSL function, and wherein the network socket handle returned by the termination of the data transmission function is maintained to identify the SSL function upon detection of the termination of the SSL function.

2. The system of claim 1, wherein the SSL function is an SSL write operation, and wherein the instructions further cause the one or more processors to:

obtain, via the first eBPF program, a pointer that represents a location for which the payload is located;

maintain, via the context, access to the pointer; and retrieve, responsive to the termination of the SSL function, the payload using the pointer.

3. The system of claim 1, wherein the network connection information represents communication across at least one of a network layer or a transport layer, and wherein the network connection information includes at least one of (i) a list of Internet Protocol (IP) addresses of the network or (ii) a list of Transmission Control Protocol (TCP) ports.

4. The system of claim 1, wherein the encrypted data packet is encrypted using an encryption key, and wherein the instructions further cause the one or more processors to:

obtain a pointer that represents a location for which the payload is located; and access, based on the context, the payload using the pointer such that the payload is accessible without the encryption key.

5. The system of claim 1, wherein the SSL function is an SSL write operation, wherein the initiation of the SSL function is an entry of the SSL write operation, and wherein the termination of the SSL function is an exit of the SSL write operation.

6. The system of claim 1, wherein the SSL function is an SSL read operation, wherein the initiation of the SSL function is an entry of the SSL read operation, and wherein the termination of the SSL function is an exit of the SSL read operation.

7. The system of claim 1, wherein the SSL function is an SSL read operation, wherein the termination of the SSL function occurs after decryption of the encrypted data packet, and wherein the instructions further cause the one or more processors to:

obtain, via the fourth eBPF program, the payload upon the termination of the SSL function.

8. The system of claim 1, wherein the instructions further cause the one or more processors to:

create, responsive to detection of the termination of the SSL function, the context of the SSL function by:

associating first data transmitted during the initiation of the SSL function with second data transmitted during the termination of the SSL function, wherein the first data and the second data include information to link the initiation of the SSL function to the termination of the SSL function; and obtain, responsive to creation of the context, the payload.

9. The system of claim 8, wherein the first data includes a pointer to a location of the payload, and wherein the payload is retrieved, using the pointer, based on the creation of the context of the SSL function.

10. A method, comprising:

obtaining, by one or more processing circuits, responsive to an establishment of a connection with a network, network connection information associated with communication across the network, wherein a plurality of computing devices and a server communicate via the network;

storing, by the one or more processing circuits, the network connection information in a first data cache, wherein one or more respective segments of the network connection information are retrievable, from the first data cache, using a corresponding network socket handle;

detecting, by the one or more processing circuits, via a first Extended Berkeley Packet Filter (eBPF) program positioned between a user application and an encryption library, an initiation of a Secure Sockets Layer (SSL) function, wherein the SSL function is initiated by a first computing device of the plurality of computing devices, and wherein the SSL function is associated with an encrypted data packet having a payload;

identifying, by the one or more processing circuits, responsive to the initiation of the SSL function, via a second eBPF program positioned between the encryption library and a network stack, an initiation of a data transmission function that is distinct from the SSL function and that results in (i) a transmission of the encrypted data packet to the network stack or (ii) receipt of the encrypted data packet from the network stack;

detecting, by the one or more processing circuits, via a third eBPF program positioned between the encryption library and the network stack, a termination of the data transmission function, wherein the termination of the data transmission function returns a network socket handle utilized during the data transmission function;

storing, by the one or more processing circuits, the network socket handle in a second data cache, wherein the network socket handle is linked, in the second data cache, to the encrypted data packet;

detecting, by the one or more processing circuits, via a fourth eBPF program positioned between the encryption library and the user application, a termination of the SSL function, wherein detection of the termination of the SSL function triggers:

a first retrieval, from the second data cache, of the network socket handle; and a second retrieval, from the first data cache using the network socket handle, one or more segments of the network connection information; and associating, by the one or more processing circuits, the one or more segments of the network connection information with the payload based on a context of the SSL function;

wherein a context of the data transmission function terminates prior to the context of the SSL function, and wherein the network socket handle returned by the termination of the data transmission function is maintained to identify the SSL function upon detection of the termination of the SSL function.

11. The method of claim 10, wherein the SSL function is an SSL write operation, and further comprising:

obtaining, by the one or more processing circuits, via the first eBPF program, a pointer that represents a location for which the payload is located;

maintaining, by the one or more processing circuits, via the context, access to the pointer; and retrieving, by the one or more processing circuits, responsive to the termination of the SSL function, the payload using the pointer.

12. The method of claim 10, wherein the network connection information represents communication across at least one of a network layer or a transport layer, and wherein the network connection information includes at least one of (i) a list of Internet Protocol (IP) addresses of the network or (ii) a list of Transmission Control Protocol (TCP) ports.

13. The method of claim 10, wherein the encrypted data packet is encrypted using an encryption key, and further comprising:

obtaining, by the one or more processing circuits, a pointer that represents a location for which the payload is located; and accessing, by the one or more processing circuits, based on the context, the payload using the pointer such that the payload is accessible without the encryption key.

14. The method of claim 10, wherein the SSL function is an SSL write operation, wherein the initiation of the SSL function is an entry of the SSL write operation, and wherein the termination of the SSL function is an exit of the SSL write operation.

15. The method of claim 10, wherein the SSL function is an SSL read operation, wherein the initiation of the SSL function is an entry of the SSL read operation, and wherein the termination of the SSL function is an exit of the SSL read operation.

16. The method of claim 10, wherein the SSL function is an SSL read operation, wherein the termination of the SSL function occurs after decryption of the encrypted data packet, and further comprising:

obtaining, by the one or more processing circuits, via the fourth eBPF program, the payload upon the termination of the SSL function.

17. The method of claim 10, further comprising:

associating, by the one or more processing circuits, first data transmitted during the initiation of the SSL function with second data transmitted during the termination of the SSL function, wherein the first data and the second data include information to link the initiation of the SSL function to the termination of the SSL function; and obtaining, by the one or more processing circuits, responsive to associating the first data with the second data, the payload.

18. One or more non-transitory storage medium storing instructions thereon that, when executed by one or more processors, cause the one or more processors to perform operations comprising:

obtaining, responsive to an establishment of a connection with a network, network connection information associated with communication across the network, wherein a plurality of computing devices and a server communicate via the network;

storing the network connection information in a first data cache, wherein one or more respective segments of the network connection information are retrievable, from the first data cache, using a corresponding network socket handle;

detecting, via a first Extended Berkeley Packet Filter (eBPF) program positioned between a user application and an encryption library, an initiation of a Secure Sockets Layer (SSL) function, wherein the SSL function is initiated by a first computing device of the plurality of computing devices, and wherein the SSL function is associated with an encrypted data packet having a payload;

identifying, responsive to the initiation of the SSL function, via a second eBPF program positioned between the encryption library and a network stack, an initiation of a data transmission function that is distinct from the SSL function and that results in (i) a transmission of the encrypted data packet to the network stack or (ii) receipt of the encrypted data packet from the network stack;

detecting, via a third eBPF program positioned between the encryption library and the network stack, a termination of the data transmission function, wherein the termination of the data transmission function returns a network socket handle utilized during the data transmission function;

storing the network socket handle in a second data cache, wherein the network socket handle is linked, in the second data cache, to the encrypted data packet;

detecting, via a fourth eBPF program positioned between the encryption library and the user application, a termination of the SSL function, wherein detection of the termination of the SSL function triggers:

a first retrieval, from the second data cache, of the network socket handle; and a second retrieval, from the first data cache using the network socket handle, one or more segments of the network connection information; and associating the one or more segments of the network connection information with the payload based on a context of the SSL function;

wherein a context of the data transmission function terminates prior to the context of the SSL function, and wherein the network socket handle returned by the termination of the data transmission function is maintained to identify the SSL function upon detection of the termination of the SSL function.

19. The one or more non-transitory storage medium of claim 18, the operations further comprising:

obtaining, via the first eBPF program, a pointer that represents a location for which the payload is located;

maintaining, via the context, access to the pointer; and retrieving, responsive to the termination of the SSL function, the payload using the pointer.

20. The one or more non-transitory storage medium of claim 18, wherein the network connection information represents communication across at least one of a network layer or a transport layer, and wherein the network connection information includes at least one of (i) a list of Internet Protocol (IP) addresses of the network or (ii) a list of Transmission Control Protocol (TCP) ports.

21. The system of claim 1, wherein the instructions further cause the one or more processors to: execute a monitoring application to detect network connections across the network and to detect one or more network socket handles, wherein the monitoring application stores the network connection information in the first data cache.

22. The method of claim 10, further comprising: executing, by the one or more processing circuits, a monitoring application to detect network connections across the network and to detect one or more network socket handles, wherein the monitoring application stores the network connection information in the first data cache.

23. The one or more non-transitory storage medium of claim 18, the operations further comprising: executing a monitoring application to detect network connections across the network and to detect one or more network socket handles, wherein the monitoring application stores the network connection information in the first data cache.

* * * * *